US010969321B2

(12) United States Patent
Yang et al.

(10) Patent No.: US 10,969,321 B2
(45) Date of Patent: Apr. 6, 2021

(54) METHOD AND SYSTEM FOR DETERMINING CONTACT ANGLE OF POROUS MEDIA

(71) Applicant: China University of Petroleum (East China), Qingdao (CN)

(72) Inventors: Yongfei Yang, Qingdao (CN); Jun Yao, Qingdao (CN); Yingwen Li, Qingdao (CN); Wenjie Zhang, Qingdao (CN); Zhihui Liu, Qingdao (CN); Haiyuan Yang, Qingdao (CN); Qianfei Lv, Qingdao (CN); Xin Wang, Qingdao (CN); Ning Wu, Qingdao (CN); Ke Wang, Qingdao (CN); Jie Liu, Qingdao (CN); Liu Tao, Qingdao (CN); Xinze Li, Qingdao (CN); Pengfei Liu, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 148 days.

(21) Appl. No.: 16/390,131

(22) Filed: Apr. 22, 2019

(65) Prior Publication Data

US 2019/0331579 A1 Oct. 31, 2019

(30) Foreign Application Priority Data

Apr. 28, 2018 (CN) .......................... 201810399573.4

(51) Int. Cl.
*G01N 13/02* (2006.01)
*E21B 49/02* (2006.01)

(52) U.S. Cl.
CPC .............. *G01N 13/02* (2013.01); *E21B 49/02* (2013.01); *G01N 2013/0208* (2013.01)

(58) Field of Classification Search
CPC ... E21B 49/02; G01N 13/02; G01N 2013/028
See application file for complete search history.

(56) References Cited

U.S. PATENT DOCUMENTS

| 5,069,065 A | * | 12/1991 | Sprunt | ................. | G01N 33/241 |
| | | | | | 73/152.09 |
| 8,805,616 B2 | * | 8/2014 | Hinkel | .................. | E21B 49/088 |
| | | | | | 702/11 |

(Continued)

FOREIGN PATENT DOCUMENTS

| CN | 104792662 A | * | 7/2015 |
| CN | 106383133 A | * | 2/2017 |
| CN | 206492662 U | * | 9/2017 |

*Primary Examiner* — John Fitzgerald
(74) *Attorney, Agent, or Firm* — IP Attorneys Group, LLC

(57) ABSTRACT

A method and system for determining contact angles of porous media, including: in a displacement simulation experiment, injecting a displacement fluid into a actual core sample, and performing computed tomography scanning on the core to determine three-dimensional images at different oil displacing time points; segmenting different phases of the three-dimensional images to obtain segmented three-dimensional images; marking a contact line between different phases according to the segmented three-dimensional images, where the phases are underground fluids or displacement fluids and a rock matrix in the displacement simulation experiment; and determining a contact angle of the porous media at different 3D positions at different time points according to the contact line. The method and system provided can obtain the dynamic changing process of the contact angle at different 3D positions in the core at different displacement time points, reflect the wettability of the real reservoir environment more accurately.

8 Claims, 5 Drawing Sheets

(56) References Cited

U.S. PATENT DOCUMENTS

| | | | |
|---|---|---|---|
| 10,000,687 B2* | 6/2018 | Al-Yousef | G01N 33/2823 |
| 10,139,347 B2* | 11/2018 | Washburn | G01N 15/088 |
| 10,429,372 B2* | 10/2019 | Al-Yousef | E21B 43/20 |
| 10,557,783 B2* | 2/2020 | Dyshlyuk | G01N 23/207 |
| 2009/0281004 A1* | 11/2009 | Ali | C09K 8/604 |
| | | | 507/219 |
| 2012/0136578 A1* | 5/2012 | Ghedan | G01N 33/24 |
| | | | 702/12 |
| 2012/0328905 A1* | 12/2012 | Guo | C21D 8/0294 |
| | | | 428/687 |
| 2014/0179888 A1* | 6/2014 | Iaconelli | C09K 8/52 |
| | | | 526/224 |
| 2014/0262288 A1* | 9/2014 | Penny | C09K 8/602 |
| | | | 166/307 |
| 2015/0053404 A1* | 2/2015 | Penny | E21B 43/26 |
| | | | 166/280.2 |
| 2015/0233223 A1* | 8/2015 | AlAmeri | E21B 43/20 |
| | | | 166/305.1 |
| 2015/0260666 A1* | 9/2015 | Dyshlyuk | G01N 25/20 |
| | | | 374/31 |
| 2015/0323517 A1* | 11/2015 | Washburn | G01N 13/02 |
| | | | 73/73 |
| 2016/0312106 A1* | 10/2016 | Penny | E21B 43/267 |
| 2017/0015893 A1* | 1/2017 | Al-Yousef | C09K 8/58 |
| 2018/0146953 A1* | 5/2018 | Jaremko | A61B 8/483 |
| 2018/0156939 A1* | 6/2018 | Stukan | E21B 49/087 |
| 2018/0169612 A1* | 6/2018 | Du | B01J 20/3293 |
| 2018/0259499 A1* | 9/2018 | Al-Yousef | G01N 13/02 |
| 2018/0327651 A1* | 11/2018 | Piri | C09K 8/592 |
| 2018/0362842 A1* | 12/2018 | Bello | C09K 8/584 |
| 2019/0062618 A1* | 2/2019 | Piri | C09K 8/602 |
| 2019/0347375 A1* | 11/2019 | Fjeldstad | G01N 13/02 |
| 2020/0110849 A1* | 4/2020 | Rabbani | G06F 30/20 |

* cited by examiner

METHOD AND SYSTEM FOR DETERMINING CONTACT ANGLE OF POROUS MEDIA

This application claims priority to Chinese application number 201810399573.4, filed Apr. 28, 2018, with a title of METHOD AND SYSTEM FOR DETERMINING CONTACT ANGLE OF POROUS MEDIA. The above-mentioned patent application is incorporated herein by reference in its entirety.

TECHNICAL FIELD

The present invention relates to the field of contact angle determinations, and in particular to a method and system for determining a contact angle of porous media.

BACKGROUND

Studying the multiphase fluids flow in porous media (reservoir is one of the porous media) is an indispensable part of the process of oil-gas field development, and wettability is a key factor affecting the multiphase flow in the porous media. Wettability is the characteristic of the surface of a material, which reflects the complex physicochemical reactions of a phase interface, and has an important influence on fluid distribution and phase interface movement in pores. Some key properties in multiphase flow, such as residual oil distribution, relative permeability and capillary force, are affected by wettability. There are many parameters for measuring wettability, and contact angle is one of the important parameters. The solid surface energy of the material can be calculated by measuring the contact angle. Contact angle measurement technology covers a wide range of applications, and can be applied to many fields, such as national defense, agriculture, industry, and scientific research. The technology for measuring contact angle has a long history, but it has limitations, so it cannot meet the needs of various industries. In the field of oil-gas field developments, the wettability of rocks in the reservoir affects the oil-water seepage law, relative permeability, capillary force and other important parameters in the oil-gas production process. Therefore, the fast and accurate acquisition of the contact angle of the fluid in the actual reservoir is of great significance for enhancing oil recovery.

Existing contact angle measurement methods are, for example, the sessile drop method, the suspension method, the Wilhelmy plate method, the vertical plate method, capillary rising method, and so on. These methods are used to select similar solid surfaces for measurement according to the rock properties of the reservoir in actual use, so as to ensure that the measurement results are close to the actual situation. However, the actual reservoir rock is complex in composition and has strong heterogeneity, and the pore wall shape of the rock varies widely and has a certain roughness. In the real reservoir environment, the roughness causes changes in the contact angle, resulting in hysteresis of the contact angle. Therefore, when conventional methods are used for measurement, these complex factors are ignored, and only the solid surface of the reservoir rock with similar property selection is measured. As a result, the measured contact angle does not conform to the actual situation, and the measurement accuracy is low, which is not representative of the wettability of rock in the real reservoir environment (high temperature and high pressure).

SUMMARY

An objective of the present invention is to provide a method and system for determining a contact angle of porous media, for solving the problem in the prior art that the measurement accuracy of the measured contact angle is low, and thus the wettability of rocks in the reservoir environment deviates from the actual situation.

To achieve the above objective, the present invention provides the following technical solutions.

A method for determining a contact angle of porous media includes: in a displacement simulation experiment, injecting a displacement fluid into a real core, and performing computed tomography (CT) scanning on the core to determine three-dimensional images at different oil displacing moments, where the displacement fluid is water, gas or a chemical agent, and the displacement simulation experiment is used to simulate the flow state of underground fluids in an in situ state;

segmenting different phases of the three-dimensional images to obtain segmented three-dimensional images;

marking a contact line between different phases according to the segmented three-dimensional images, where the phases are underground fluids or displacement fluids and a rock matrix in the displacement simulation experiment; and determining a contact angle of a porous medium at different positions at different moments according to the contact line.

Optionally, the segmenting different phases of the three-dimensional images to obtain segmented three-dimensional images specifically includes:

segmenting different phases of the three-dimensional images with a local-overall segmentation method to determine the segmented three-dimensional images.

Optionally, the marking a contact line between different phases according to the segmented three-dimensional images specifically discloses:

marking the contact line between different phases with a boundary extraction algorithm according to the segmented three-dimensional images.

Optionally, the determining a contact angle of the porous medium at different positions at different moments according to the contact line specifically includes:

determining a contact angle of the porous medium with a tangent method according to the contact line.

A system for determining a contact angle of porous media includes:

a three-dimensional image determining module configured to, in a displacement simulation experiment, inject a displacement fluid into a real core, and perform computed tomography (CT) scanning on the core to determine three-dimensional images at different oil displacing moments, where the displacement fluid is water, gas or a chemical agent, and the displacement simulation experiment is used to simulate the flow state of underground fluids in an in situ state;

a segmenting module configured to distinguish different phases of the three-dimensional images to obtain segmented three-dimensional images;

a contact line marking module configured to mark a contact line between different phases according to the segmented three-dimensional images, where the phases are underground fluids or displacement fluids and a rock matrix in the displacement simulation experiment; and a contact angle determining module configured to determine a contact angle of a porous medium at different positions at different moments according to the contact line.

Optionally, the segmenting module specifically includes:

a segmenting unit configured to distinguish different phases of the three-dimensional images with a local-overall segmentation method to determine the segmented three-dimensional images.

Optionally, the contact line marking module specifically includes:

a contact line marking unit configured to mark the contact line between different phases with a boundary extraction algorithm according to the segmented three-dimensional images.

Optionally, the contact angle determining module specifically includes:

a contact angle determining unit configured to determine a contact angle of the porous medium with a tangent method according to the contact line.

According to specific embodiments provided by the present invention, the present invention discloses the following technical effects: the present invention discloses a method and system for determining a contact angle of porous media, obtains a core of a porous medium, performs a displacement simulation experiment on the core, performs computed tomograhy (CT) scanning on the core continuously flooded by displacement fluids, and then analyzes three-dimensional images obtained from different actual oil displacing periods, so that the dynamic change process of the contact angle can be obtained, that is, the change process of the contact angle during the oil-water flowing process. Compared with the prior art in which only the solid surface of the reservoir rock with similar property selections is measured to obtain the contact angle, the contact angle obtained by measuring only the solid surface is single, the dynamic change process of the contact angle cannot be reflected, and the wettability of the rock is described with only a single contact angle value. Therefore, reflecting the wettability of the real reservoir environment with the contact angle is low in precision. However, the dynamic change process of the contact angle of the present invention fully considers the change of the contact angle with time at different positions, and can reflect the wettability in the real reservoir environment better.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method and system for determining a contact angle of porous media, for reflecting the wettability in a real reservoir environment better.

To make the foregoing objective, features, and advantages of the present invention clearer and more comprehensible, the present invention is further described in detail below with reference to the accompanying drawings and specific embodiments.

During application of contact angle measurement in the prior art to the field of oil-gas development, the contact angle measurement ignores many influence factors, such as the roughness of the pore surface, the irregular curvature of the pore space shape, the complexity of the rock mineral compositions, and the inadequacies are that the contact angle cannot reflect the dynamic change process in the pores when the fluid flows. Therefore, the existing technology actually describes the wettability of the rock from one perspective. As a result, the wettability of the rock described by the contact angle cannot be truly reflected the real environment of the reservoir.

Figure 1:
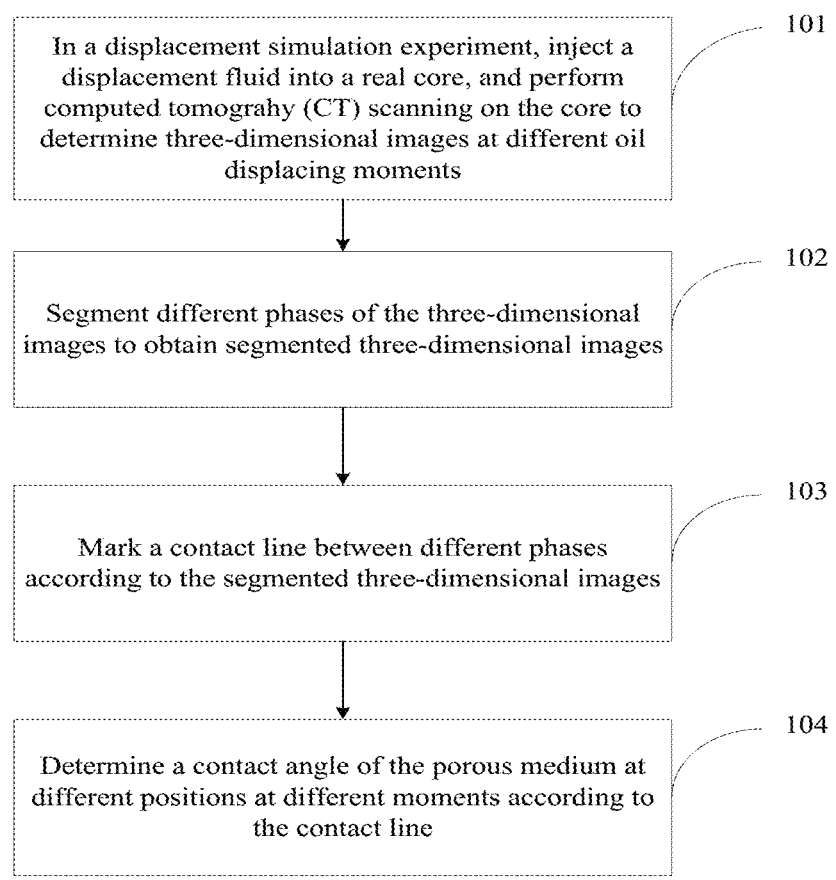
FIG. 1 is a flowchart of a method for determining a contact angle provided by the present invention.

FIG. 1 is a flowchart of a method for determining a contact angle provided by the present invention. As shown in FIG. 1, the method for determining a contact angle of porous media includes:

Step 101: in a displacement simulation experiment, a displacement fluid is injected into a real core, and CT scanning is performed on the core to determine three-dimensional images at different oil displacing moments, where the displacement fluid is water, gas or a chemical agent, and the displacement simulation experiment is used to simulate the flow state of underground fluids in an in situ state.

During the simulation experiment, different time periods are selected for scanning, to obtain the dynamic change process of the contact angle during the flow process at different moments, and the time change can be obtained, which has the concept of 4D.

Step 102: different phases of the three-dimensional images are segmented to obtain segmented three-dimensional images.

The displacement simulation experiment is performed on the actual core from oil field to simulate the flow of underground fluids (oil, gas, and water), and it is assumed that two-phase flow (p1 phase\p2 phase) selects different injection moments, where the injection moments simulate the oil-gas field development process, i.e., the actual oil displacing period. During the oil-gas field development, the crude oil is displaced by injecting water or gas, etc., and the distributions of underground fluids such as oil, gas, and water are different at different production times.

In addition, the p1 phase and the p2 phase are generally fluids involved in the production process. In general, one phase is oil, and the other phase is water or other liquid or gas for displacing the oil flow. To illustrate that the color of the fluid gray-scale image of different phases after processing is different, the segmentation can be performed on this basis. Taking the water displacement of oil process as an example, the p1 phase is water, and the p2 phase is oil. It is more universal with the expressions of p1 and p2.

The amount of injection is different at different production times. The injection volume increases with the extension of time. Different injection moments correspond to corresponding moments in the actual production process. According to different research objectives, the CT scanning is performed on the core by artificially controlling the moment of CT scanning, to obtain three-dimensional images. The injected fluid can be water, gas, chemical agents, or other fluids that may be used in production.

Figure 2A:
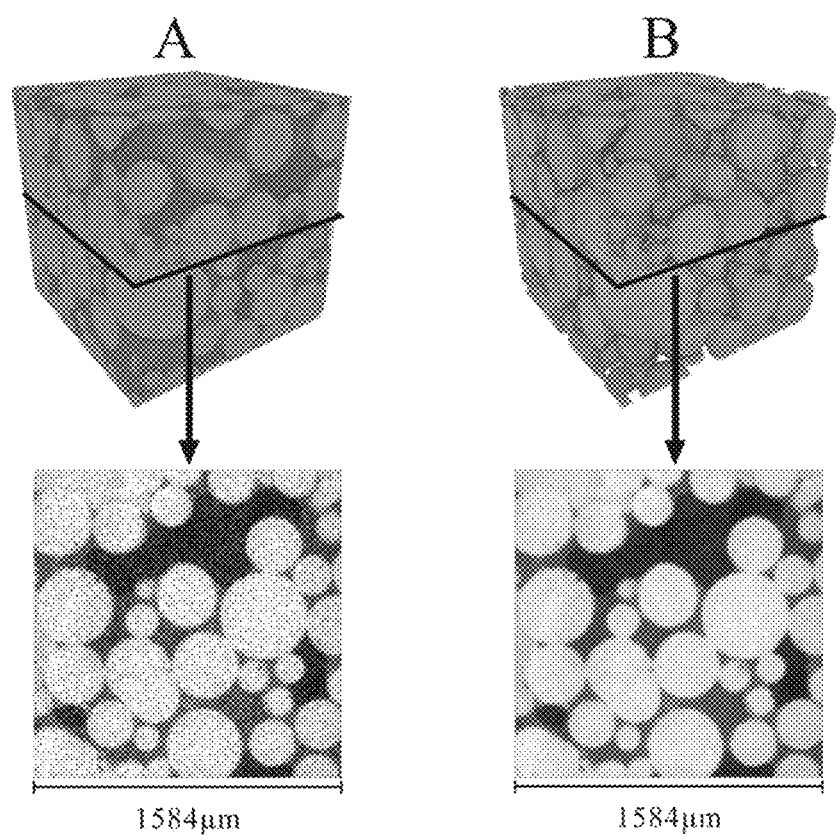
FIG. 2a is a comparison diagram of unprocessed and processed three-dimensional images provided by the present invention.
Figure 2B:
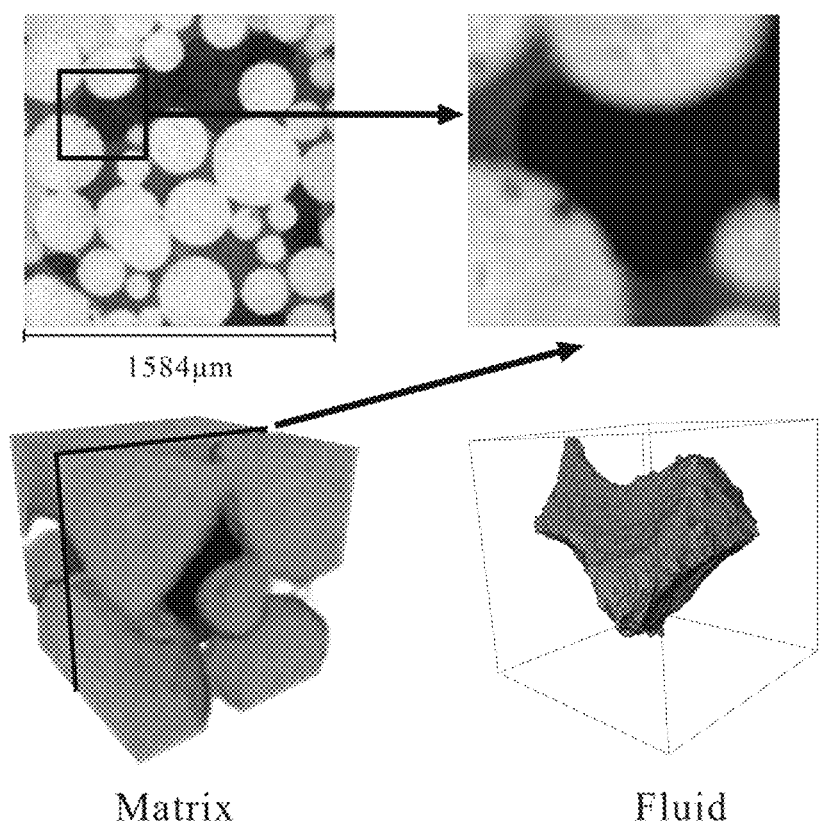
FIG. 2b is a local segmentation diagram of the processed image provided by the present invention.

In practical applications, the segmentation process of the three-dimensional images can include the following operations:

importing the obtained three-dimensional images into image processing software, filtering the images, reducing image noise, and improving image sharpness for subsequent processing. FIG. 2a is a comparison diagram of unprocessed and processed three-dimensional images provided by the present invention. As shown in FIG. 2a, where A is the unprocessed image, B is the processed image, white refers to the rock matrix, gray refers to the p1 phase, and black refers to the p2 phase. FIG. 2b is a local segmentation diagram of the processed image provided by the present invention. As shown in FIG. 2b, the image to be segmented is first divided into several local images, the local images are segmented, and then a segmentation result is applied to the overall image, thereby avoiding inaccurate segmentation caused by a single threshold.

The filtered image is segmented into different phases (p1\p2\rock) according to different gray-scale values. Since the data volume is generally larger and has high requirement to a computer, and gray-scale thresholds in the data volume are greatly different due to the CT characteristics, the overall segmentation with a single gray-scale threshold cannot obtain a better segmentation effect. The present invention adopts a local-overall segmentation method, specifically including:

a smaller data volume (10*10) is extracted from a gray-scale data volume (for example, the data size is 100*100), and values in which the gray-scale values changes greatly are removed, and then are normalized, so that the gray-scale interval is converted to 0-255, and segmentation is performed with a watershed algorithm;

the previous step is repeated, the overall data volume is processed with the same method, and different phases are marked (using "0, 1, 2" to respectively represent the white rock matrix, the gray p1 phase, and the black p2 phase).

Step 103: a contact line between different phases is marked according to the segmented three-dimensional images, where the phases are underground fluids or displacement fluids and a rock matrix in the displacement simulation experiment.

Figure 3:
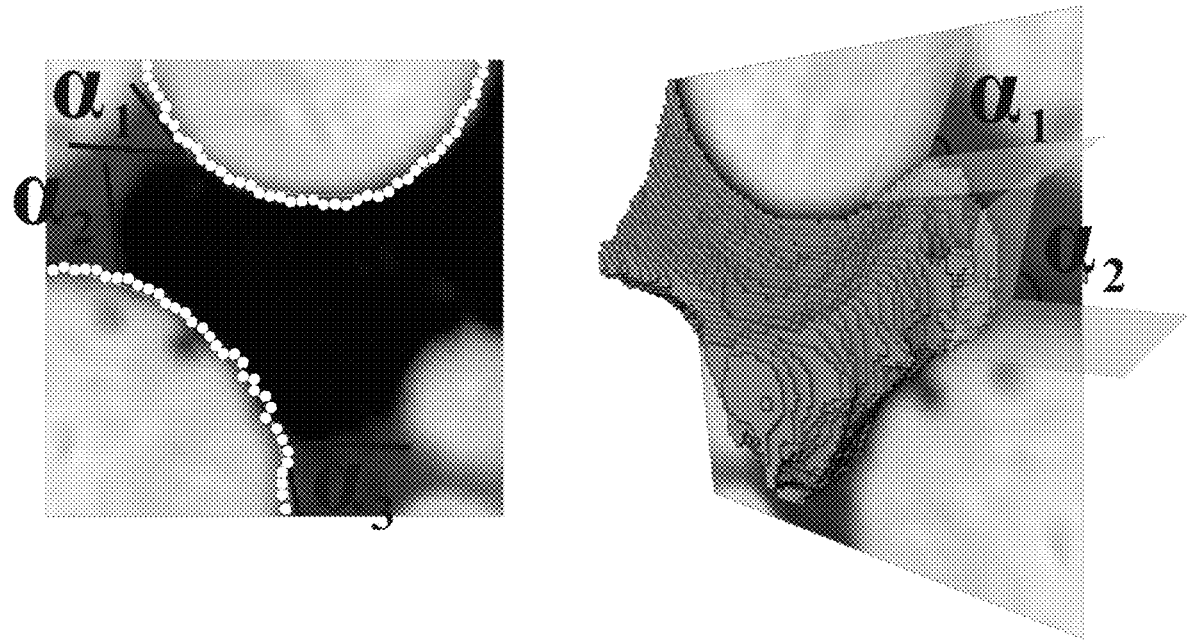
FIG. 3 is a schematic diagram of a contact line mark provided by the present invention.
Figure 4:
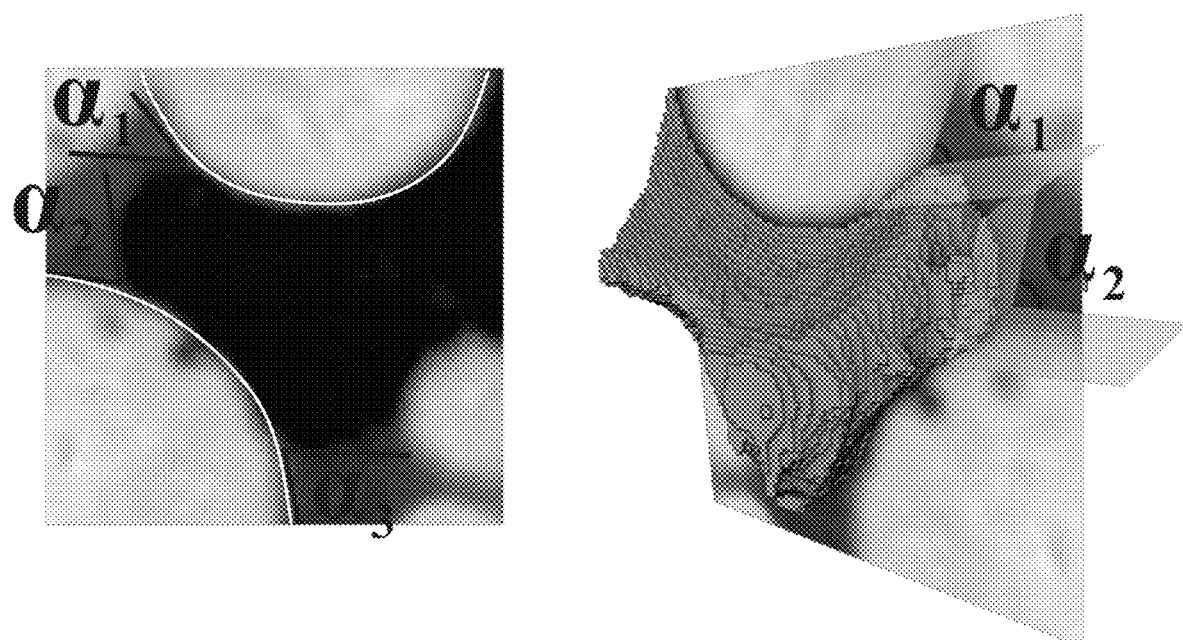
FIG. 4 is a schematic diagram of a smoothed contact line provided by the present invention.

A contact line between different phases is marked with a boundary extraction algorithm according to the segmented three-dimensional images. The points containing all types of marks are three-phase contact points. As shown in FIG. 3, an image passing through a three-phase junction point is selected, and the marked contact line is smoothed. The smoothed image is as shown in FIG. 4.

Step 104: a contact angle of the porous medium at different positions at different moments is determined according to the contact line.

Figure 5:
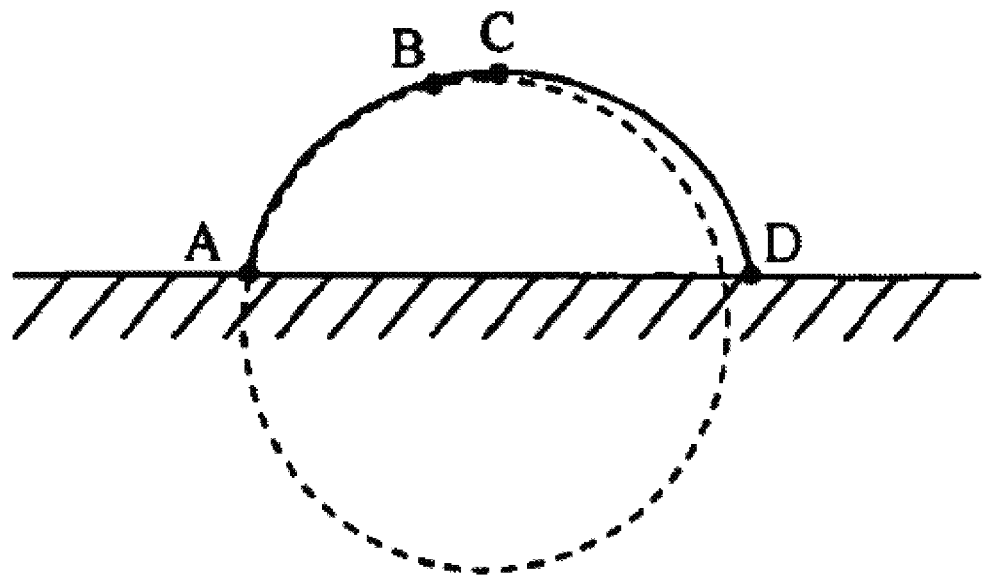
FIG. 5 is a schematic diagram of a horizontal droplet provided by the present invention.

In practical applications, the contact angle of the porous medium is determined with a tangent method according to the contact line. The basic concept of the tangent method is to generate a virtual circle, and adjust the position of the center of the circle and the size of the radius, so that the virtual circle coincides with the contour of the droplet boundary as much as possible. FIG. 5 is a schematic diagram of a horizontal droplet provided by the present invention. The contour of the droplet is not a standard arc. Taking a left contact angle as an example, to determine a correct left contact angle of the droplet, it is necessary to find an optimal inscribed circle so that it coincides with the contour of the left boundary of the original droplet as much as possible. The coincident section in FIG. 5 is AB, that is, the arc section can be replaced by the standard arc, and then the arc segment can be tangent to obtain the contact angle.

The contact angle method provided by the present invention does not use materials similar to the test materials and does not require complicated processing of the test materials, and can be applied to the core of the oilfield, taking into account factors such as heterogeneity and roughness.

The contact angle method provided by the present invention can be applied to the measurement of contact angle between various fluids in the oilfield production process, such as water displacement of oil, chemical displacement of oil such as polymers, foam displacement of oil, gas displacement of oil, and carbon dioxide storage. Compared with the conventional measurement method, the application range of this method is wider.

The present invention adopts the real core, simulates the flow of the fluids in the oil-gas production process, and adopts the CT technology to obtain an internal structure of the core and distribution images of the fluids therein at different flow moments, and calculates the contact angle and its distribution by processing the obtained three-dimensional images. Since this solution is applied to the real core, the CT technology can image pore structure and fluid distribution with nondestructive, which can overcome the shortcomings of the conventional method. Performing CT scanning at different displacement moments can obtain the dynamic change process of the contact angle, so that the contact angle of fluids in the real reservoir environment can be reflected more accurately.

Figure 6:
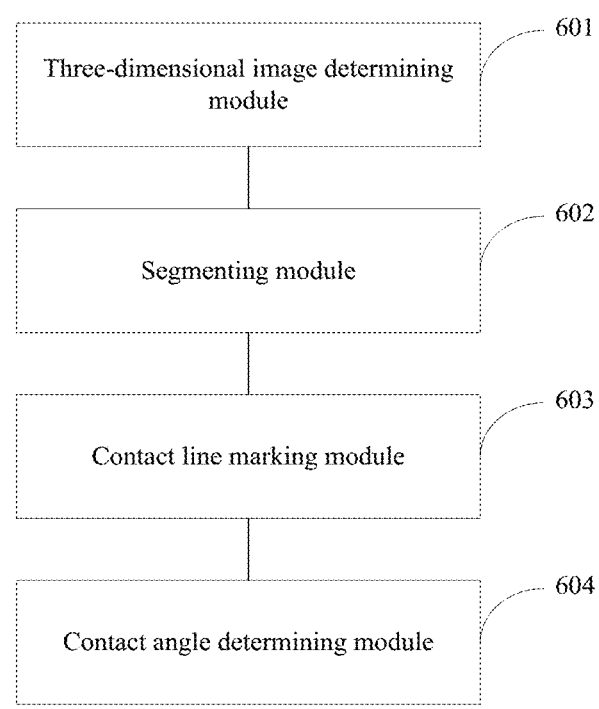
FIG. 6 is a structural diagram of a system for determining a contact angle provided by the present invention.

FIG. 6 is a structural diagram of a system for determining a contact angle provided by the present invention. As shown in FIG. 6, the system for determining a contact angle of porous media includes:

a three-dimensional image determining module 601 configured to, in a displacement simulation experiment, inject a displacement fluid into a real core, and perform CT scanning on the core to determine three-dimensional images at different oil displacing moments, where the displacement fluid is water, gas or a chemical agent, and the displacement simulation experiment is used to simulate the flow state of underground fluids in an in situ state;

a segmenting module 602 configured to distinguish different phases of the three-dimensional images to obtain segmented three-dimensional images;

the segmenting module 602 specifically includes a segmenting unit configured to distinguish different phases of the three-dimensional images with a local-overall segmentation method to determine the segmented three-dimensional images;

a contact line marking module 603 configured to mark a contact line between different phases according to the segmented three-dimensional images, where the phases are underground fluids or displacement fluids and a rock matrix in the displacement simulation experiment;

the contact line marking module 603 specifically includes a contact line marking unit configured to mark the contact line between different phases with a boundary extraction algorithm according to the segmented three-dimensional images;

a contact angle determining module 604 configured to determine a contact angle of a porous medium at different positions at different moments according to the contact line;

the contact angle determining module 604 specifically includes a contact angle determining unit is configured to determine a contact angle of the porous medium with a tangent method according to the contact line.

The present invention combines the contact angle measurement with the CT scanning technology, and in the actual core, the dynamic change process of the contact angle during the fluid flow is obtained through measurement in the in-situ state, and the time change can be obtained, which has the concept of 4D. Therefore, the contact line method and system of the present invention are actually a 4D in-situ method and system for determining a contact angle of porous media to obtain a dynamic change process of contact lines at different positions at different moments.

The present invention adopts a method of local segmentation and overall processing, thereby improving the accuracy of image segmentation processing.

The method and system for determining a contact angle provided by the present invention can be applied to different scenarios, and are applicable to the dynamic change process of the contact angle in any flow process (e.g., water displacement of oil, chemical displacement of oil such as polymers, foam displacement of oil, gas displacement of oil, and carbon dioxide storage, etc.).

The measurement environment (in-situ state) of the present invention is closer to the real environment. The prior art adopts materials similar to the test materials or needs to process the test materials. However, the present invention can directly measure the core of the oilfield, and the contact angle measurement takes into account the influence of positional space such as heterogeneity and roughness, and thus, the measurement is more accurate.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for determining a contact angle of porous media, comprising:

in a displacement simulation experiment, injecting a displacement fluid into an actual core sample removed from a formation, and performing computed tomography (CT) scanning on the core to determine three-dimensional images at different oil displacing time points, wherein the displacement fluid is water, gas or a chemical agent, and the displacement simulation experiment is used to simulate the flow state of underground fluids in an in situ state;

segmenting different phases of the three-dimensional images to obtain segmented three-dimensional images;

marking a contact line between different phases according to the segmented three-dimensional images, wherein the phases are underground fluids or displacement fluids and a rock matrix in the displacement simulation experiment; and determining a contact angle of the porous media at different 3D positions at different time points according to the contact line.

2. The method according to claim 1, wherein the segmenting different phases of the three-dimensional images to obtain segmented three-dimensional images specifically comprises:

segmenting different phases of the three-dimensional images with a local-overall segmentation method to determine the segmented three-dimensional images.

3. The method according to claim 1, wherein the marking the contact line between different phases according to the segmented three-dimensional images specifically comprises:

marking the contact line between different phases with a boundary extraction algorithm according to the segmented three-dimensional images.

4. The method according to claim 1, wherein the determining the contact angle of the porous media at different 3D positions at different time points according to the contact line specifically comprises:

determining the contact angle of the porous media with a tangent method according to the contact line.

5. A system for determining a contact angle of porous media, comprising:

a three-dimensional image determining module configured to, in a displacement simulation experiment, inject a displacement fluid into an actual core sample removed from a formation, and perform computed tomography (CT) scanning on the core to determine three-dimensional images at different oil displacing time points, wherein the displacement fluid is water, gas or a chemical agent, and the displacement simulation experiment is used to simulate the flow state of underground fluids in an in situ state;

a segmenting module configured to segment different phases of the three-dimensional images to obtain segmented three-dimensional images;

a contact line marking module configured to mark a contact line between different phases according to the segmented three-dimensional images, wherein the phases are underground fluids or displacement fluids and a rock matrix in the displacement simulation experiment; and a contact angle determining module configured to determine a contact angle of the porous media at different 3D positions at different time points according to the contact line.

6. The system according to claim 5, wherein the segmenting module specifically comprises:

a segmenting unit configured to segment different phases of the three-dimensional images with a local-overall segmentation method to determine the segmented three-dimensional images.

7. The system according to claim 5, wherein the contact line marking module specifically comprises:
a contact line marking unit configured to mark the contact line between different phases with a boundary extraction algorithm according to the segmented three-dimensional images.

8. The system according to claim 5, wherein the contact angle determining module specifically comprises:
a contact angle determining unit configured to determine the contact angle of the porous media with a tangent method according to the contact line.

* * * * *